United States Patent
Chandraker et al.

(10) Patent No.: US 11,710,346 B2
(45) Date of Patent: Jul. 25, 2023

(54) FACIAL RECOGNITION FOR MASKED INDIVIDUALS

(71) Applicant: NEC Laboratories America, Inc., Princeton, NJ (US)

(72) Inventors: Manmohan Chandraker, Santa Clara, CA (US); Ting Wang, West Windsor, NJ (US); Xiang Xu, Mountain View, CA (US); Francesco Pittaluga, Los Angeles, CA (US); Gaurav Sharma, Newark, CA (US); Yi-Hsuan Tsai, Santa Clara, CA (US); Masoud Faraki, San Jose, CA (US); Yuheng Chen, South Brunswick, NJ (US); Yue Tian, Princeton, NJ (US); Ming-Fang Huang, Princeton, NJ (US); Jian Fang, Princeton, NJ (US)

(73) Assignee: NEC Corporation

( * ) Notice: Subject to any disclaimer, the term of this patent is extended or adjusted under 35 U.S.C. 154(b) by 127 days.

(21) Appl. No.: 17/330,832

(22) Filed: May 26, 2021

(65) Prior Publication Data
US 2021/0374468 A1    Dec. 2, 2021

Related U.S. Application Data

(60) Provisional application No. 63/031,483, filed on May 28, 2020.

(51) Int. Cl.
G06V 40/16    (2022.01)
G06T 3/00    (2006.01)
G06V 10/774    (2022.01)

(52) U.S. Cl.
CPC ........ *G06V 40/172* (2022.01); *G06T 3/0006* (2013.01); *G06V 10/774* (2022.01); *G06V 40/171* (2022.01)

(58) Field of Classification Search
CPC ........ G06V 40/171–172; G06V 10/774; G06T 3/0006
See application file for complete search history.

(56) References Cited

U.S. PATENT DOCUMENTS

| | | | |
|---|---|---|---|
| 2018/0349682 A1* | 12/2018 | Wong | G06V 40/172 |
| 2019/0050632 A1 | 2/2019 | Weng et al. | |
| 2019/0251401 A1* | 8/2019 | Shechtman | G06V 20/20 |
| 2019/0332851 A1 | 10/2019 | Han et al. | |
| 2021/0295015 A1* | 9/2021 | Lei | G06N 3/084 |

OTHER PUBLICATIONS

Wang et al, "Masked Face Recognition Dataset and Application" (published at arXiv:2003.09093, Mar. 2020) (Year: 2020).*

(Continued)

*Primary Examiner* — Casey L Kretzer
(74) *Attorney, Agent, or Firm* — Joseph Kolodka

(57) ABSTRACT

Methods and systems for training a neural network include generate an image of a mask. A copy of an image is generated from an original set of training data. The copy is altered to add the image of a mask to a face detected within the copy. An augmented set of training data is generated that includes the original set of training data and the altered copy. A neural network model is trained to recognize masked faces using the augmented set of training data.

16 Claims, 8 Drawing Sheets

(56) References Cited

OTHER PUBLICATIONS

Jetchevetal, "The Conditional Analogy GAN: Swapping Fashion Articles on People Images" (published at arXiv:1709.04695, Sep. 2017) (Year: 2017).*

Shi, Yichun, et al., "Towards Universal Representation Learning for Deep Face Recognition", InProceedings of the IEEE/CVF Conference on Computer Vision and Pattern Recognition 2020. Feb. 2, 2020, pp. 1-16.

* cited by examiner

FACIAL RECOGNITION FOR MASKED INDIVIDUALS

RELATED APPLICATION INFORMATION

This application claims priority to U.S. Patent Application No. 63/031,483, filed on May 28, 2020, incorporated herein by reference in its entirety.

BACKGROUND

Technical Field

The present invention relates to facial recognition, and more particularly, to training a machine learning model to recognize masked faces.

Description of the Related Art

While facial recognition technology is becoming increasingly prevalent, facial occlusion can frustrate classifiers that are trained on training data that has clear face images. One common type of occlusion is the wearing of a face mask, which may cover the entire lower half of a person's face. Existing training datasets may not have a representative sample of images that include face masks.

SUMMARY

A method for training a neural network include generating an image of a mask. A copy of an image is generated from an original set of training data. The copy is altered to add an image of the mask to a face detected within the copy. An augmented set of training data is generated that includes the original set of training data and the altered copy. A neural network model is trained to recognize masked faces using the augmented set of training data.

A method for training a neural network model includes generating an image of a mask. A copy of an image is generated from an original set of training data. The copy is altered to add the image of a mask to a face detected within the copy, using an affine transformation. The affine transformation includes identifying facial key points of the detected face, scaling the mask image based on a width of the detected face, using the facial key points, aligning a center of the mask image to a center of the detected face, using the facial key points, and rotating the mask image to match a head pose yaw angle of the detected face, based on the facial key points. An augmented set of training data is generated that includes the original set of training data and the altered copy. A neural network model is trained to recognize masked faces using the augmented set of training data.

A system for system for training a neural network model includes a hardware processor and a memory that stores a computer program product. When the computer program product is executed by the hardware processor, is causes the hardware processor to generate an image of a mask, to generate a copy of an image from an original set of training data, to alter the copy to add the image of a mask to a face detected within the copy, to generate an augmented set of training data that includes the original set of training data and the altered copy, and to train a neural network model to recognize masked faces using the augmented set of training data.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

To improve the efficacy of facial recognition in the presence of occlusion, for example when used for individuals who are wearing face masks, a training dataset may be augmented to create images that represent the appearance of people with particular forms of occlusion. For example, images from the dataset may be automatically edited in such a way as to superimpose images of face masks. A classifier that is trained on such an augmented training dataset will have the ability to recognize masked individuals, without having to manually curate training data that includes masks.

Toward that end, multiple transformations are described herein that can automatically augment a training dataset with masks. In a first transformation, an input face image may be combined with an input mask image using a two-dimensional affine transformation. In a second transformation, style transfer may be performed using a generative adversarial network (GAN) to generate faces with different styles (e.g., mask usage).

Figure 1:
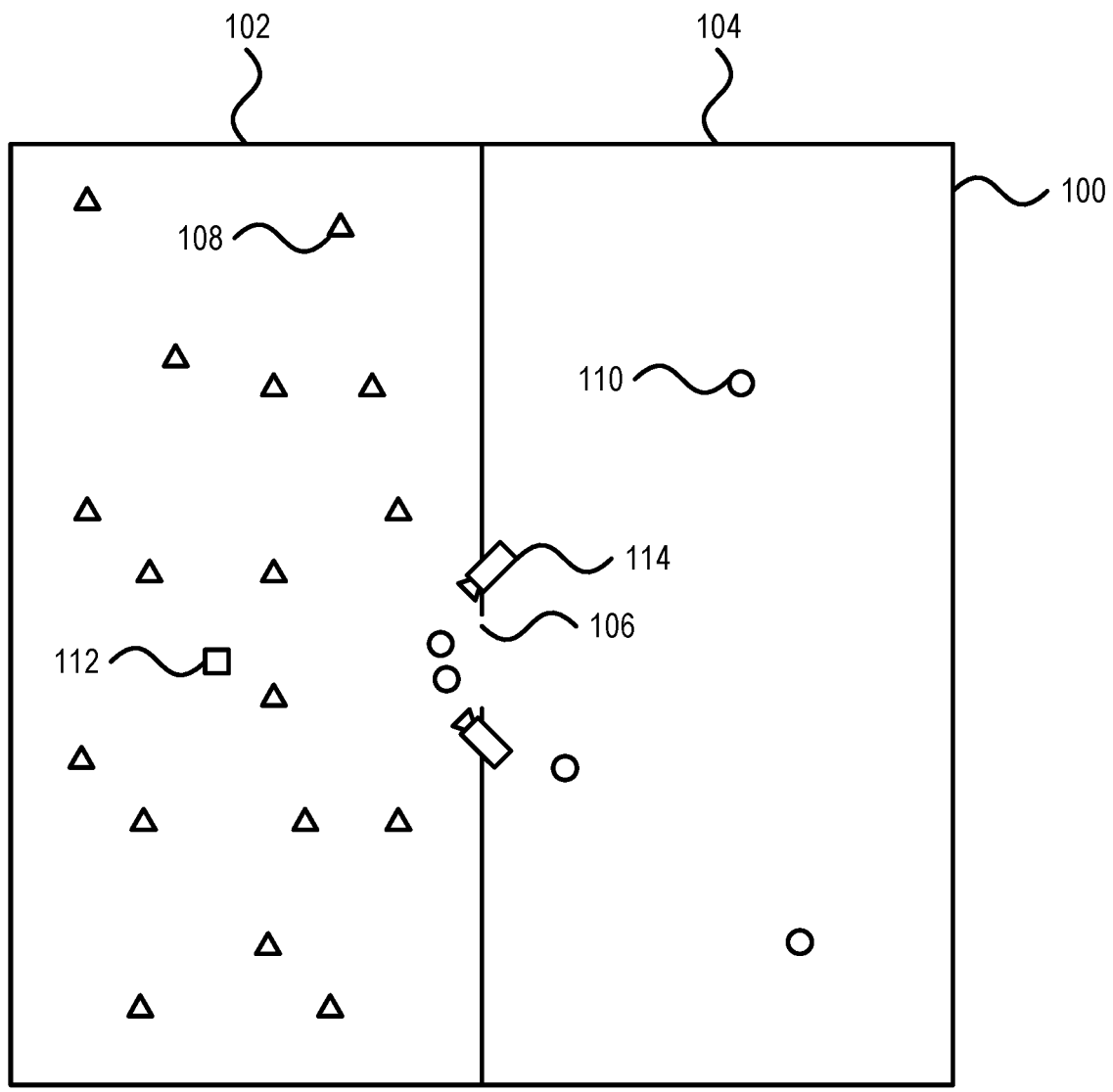
FIG. 1 is a diagram of a space that uses facial recognition to regulate access to a controlled area, with the ability to recognize individuals who are wearing masks, in accordance with an embodiment of the present invention.

Referring now to FIG. 1, an exemplary monitored environment 100 is shown. The environment 100 shows two regions, including an uncontrolled region 102 and a controlled region 104. It should be understood that this simplified environment is shown solely for the sake of illustration, and that realistic environments may have many such regions, with differing levels of access control. For example, there may be multiple distinct controlled regions 104, each having different sets of authorized personnel with access to them. In some embodiments, regions may overlap.

A boundary is shown between the uncontrolled region 102 and the controlled region 104. The boundary can be any appropriate physical or virtual boundary. Examples of physical boundaries include walls and rope—anything that establishes a physical barrier to passage from one region to the other. Examples of virtual boundaries include a painted line and a designation within a map of the environment 100. Virtual boundaries do not establish a physical barrier to movement, but can nonetheless be used to identify regions with differing levels of control. A gate 106 is shown as a passageway through the boundary, where individuals are permitted to pass between the uncontrolled region 102 and the controlled region 104.

A number of individuals are shown, including unauthorized individuals 108, shown as triangles, and authorized individuals 110, shown as circles. Also shown is a banned individual 112, shown as a square. The unauthorized individuals 108 are permitted access to the uncontrolled region 102, but not to the controlled region 104. The authorized individuals are permitted access to both the uncontrolled region 102 and the controlled region 104. The banned individual 112 is not permitted access to either region.

The environment 100 is monitored by a number of video cameras 114. Although this embodiment shows the cameras 114 being positioned at the gate 106, it should be understood that such cameras can be positioned anywhere within the uncontrolled region 102 and the controlled region 104. The video cameras 114 may capture live streaming video of the individuals in the environment, and particularly of those who attempt to enter the controlled region 104. In some cases, the video cameras 114 may generate still images responsive to particular stimuli, for example upon an access request.

During operation, the streaming video may be used to determine whether a given individual is authorized to enter the controlled region 104. For example, as a user approaches the gate 106, a facial recognition system may be used to match the user to a database of authorized individuals 110. If the user is authorized, then access may be granted. If the user is not authorized, or is banned, then an alarm may sound or any other appropriate action may be taken.

Some of the individuals may have part of their faces occluded, for example by a carried object or a face mask. The facial recognition system may be trained using a training dataset that includes images of people with face masks and other types of occlusion, so that authorized individuals may be recognized despite the occlusion.

Figure 2:
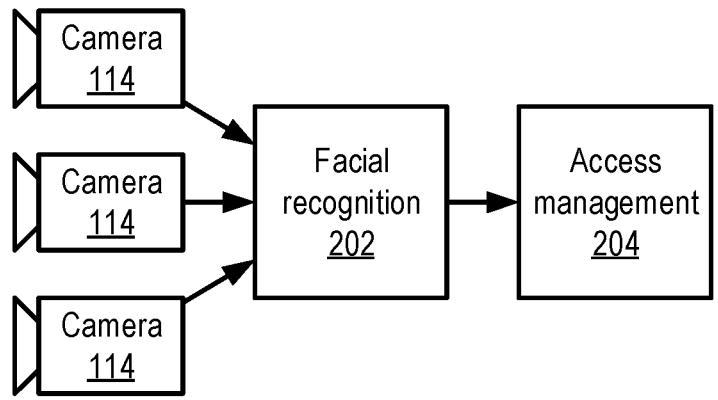
FIG. 2 is a block diagram of an access management system that uses facial recognition, in accordance with an embodiment of the present invention.

Referring now to FIG. 2, a block diagram is shown of a facial recognition and access management. Video streams from the cameras 114 pass to facial recognition 202. Facial recognition 202 may include, for example, a machine learning model that detects and locates faces within the incoming video streams, identifies features of the detected faces, and matches those features to a databased of authorized individuals. In this manner, facial recognition 202 determines whether an individual is in the database.

Access management 204 then controls an appropriate response to the recognition of the individual. For example, if the gate 106 is a door, turnstile, or some other form of device that can be remotely controlled, then access may be granted or denied responsive to a determination of the recognized individual's access privileges. As another example, the access management 204 may trigger a visual or audio alert if the person is not recognized, or is recognized but does not have access privileges for the controlled area 104. The access management 204 may furthermore request intervention by human personnel, for example by summoning a security official.

Although access management 204 is specifically contemplated and described herein, other actions may be taken in addition to, or instead of, access management. For example, facial recognition 202 may be used to classify images as to whether the people are complying with mask regulations, such as during a public health emergency. The facial recognition 202 may also be used to identify when masks are being worn improperly. In such cases, instead of access management, security personnel may be notified to respond to the breach of regulations and an informational alert may be supplied to the person, to instruct them on proper use of their mask.

Figure 3:
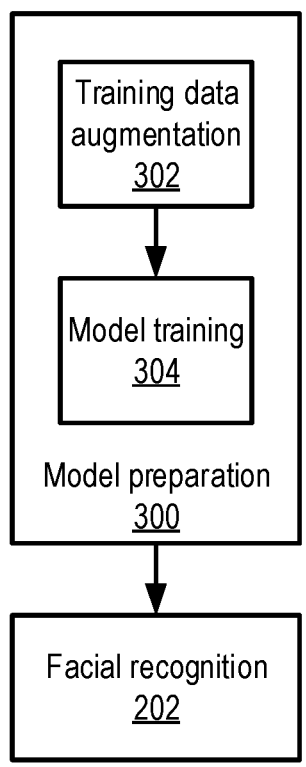
FIG. 3 is a block/flow diagram of a method of training and using a facial recognition model using training data that is augmented to include masks, in accordance with an embodiment of the present invention.

Referring now to FIG. 3, a method for preparing and using a facial recognition model is shown. The facial recognition model is prepared in block 300, and then is subsequently used in facial recognition 202. These two steps are separable—the model may be implemented in a software or hardware product that is sold and deployed to a location, and then is used by a different entity for facial recognition.

Preparing the facial recognition includes augmenting a training dataset in block 302 and then training the model using the augmented training dataset in block 304. The original training dataset may come from any source, and may include a set of images, at least some of which may include images of people's faces. It is specifically contemplated that the original training dataset may lack a particular kind of occlusion feature of interest, which the model is to be trained to accommodate. Augmentation 302 may make copies of certain images from the original training dataset and may automatically alter those copies, for example to include the occlusion feature of interest.

When training 304 of the model is performed, the augmented training dataset may be used in place of the original dataset. The augmented dataset may include all of the original images, in addition to the altered images, or may include a partial subset of either group. The training process creates a facial recognition model that has the ability to recognize faces, even if they have been occluded by a mask.

Figure 4:
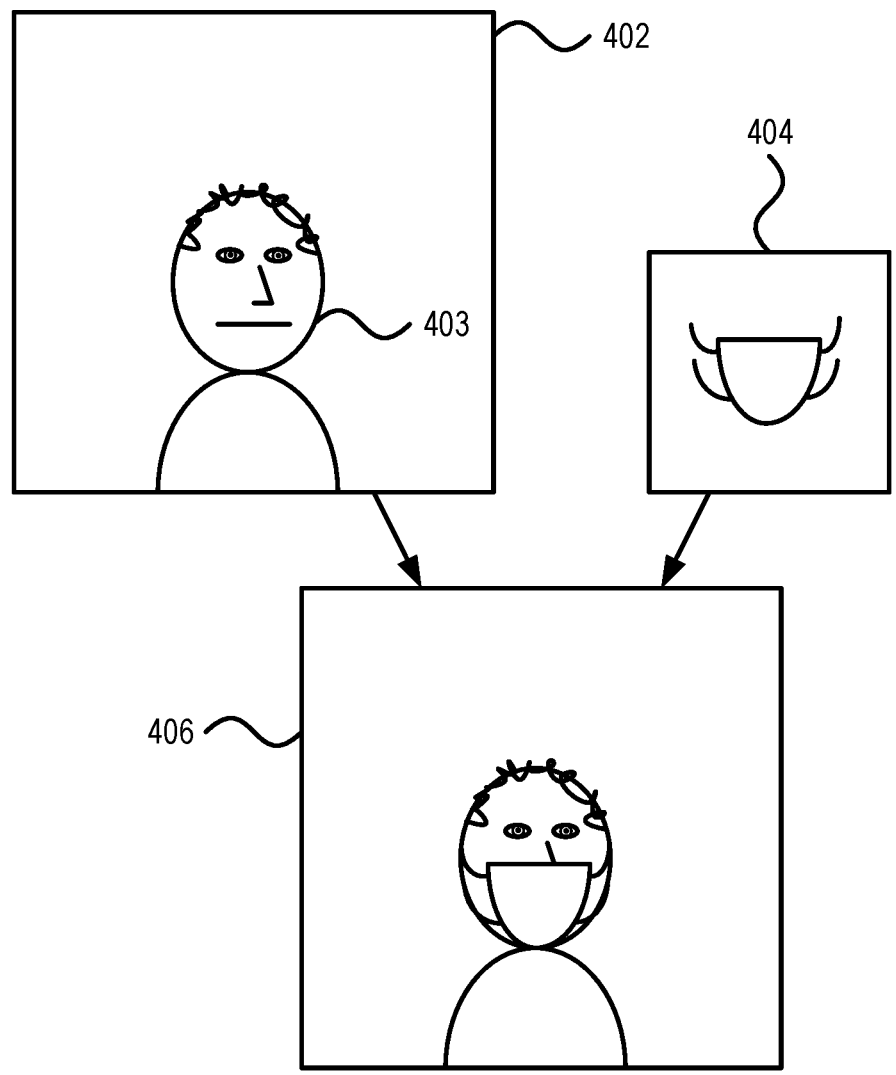
FIG. 4 is a diagram of a transformation that may be used to augment training data to include images of individuals wearing masks, in accordance with an embodiment of the present invention.

Referring now to FIG. 4, an example of a form of data augmentation 302 is shown. In this example, an original image 402 is shown that includes a person's face 403. An image of a mask 404 is superimposed on the original image 402 to create masked image 406. This may be performed with a variety of different mask images 404 in different styles, so that the model is not trained on too specific of a dataset. For example, mask images 404 may be drawn from catalog images, thereby avoiding the need to have people wear a variety of different masks in a variety of different contexts to generate training data.

To perform the combination, block 302 may perform an affine transformation, which may be a transformation that preserves collinearity and ratios of distances in an image. Thus, the transformation may rotate and deform the mask image 404 to match the general proportions of the face 403 within the original image 402, and may position the mask image 404 over the face 403 to approximate the appearance of a genuine photo of a person wearing a mask.

To perform this transformation, key points of the face 403 may be detected. These "key points" may represent facial features such as the outlines of the eyes, nose, mouth, chin, and cheeks. The mask image 404 may then be transformed to orient it with respect to the face 403, and may be stretched to cover the mouth and nose of the face 403 in a realistic manner.

The transformation of block 302 may be performed using an attribute-based GAN. A GAN is a type of artificial neural network (ANN) that uses two parts—a generator and a discriminator. In this case, the generator may map features from a latent space to an output image, where the output image includes desired attributes. Thus, a trained generator may generate images with one or more types of occlusion, such as a face mask.

For example, an input image may be mapped onto a latent space, using three-dimensional dense shape reconstruction to identify a texture image of the person's facial features and the three-dimensional positions of those facial features. The pose of the original image may be determined and compensated for to fill in any portions of the texture image that are not visible in the original image, for example because the face is turned away from the camera.

Using this information, the texture may be modified to include attributes such as a mask, a particular facial expression, and other effects. The texture may then be reapplied to the original image, using the determined locations, to create an altered image that reflects the appearance of the person in the original image, as if they had been wearing a mask.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Figure 5:
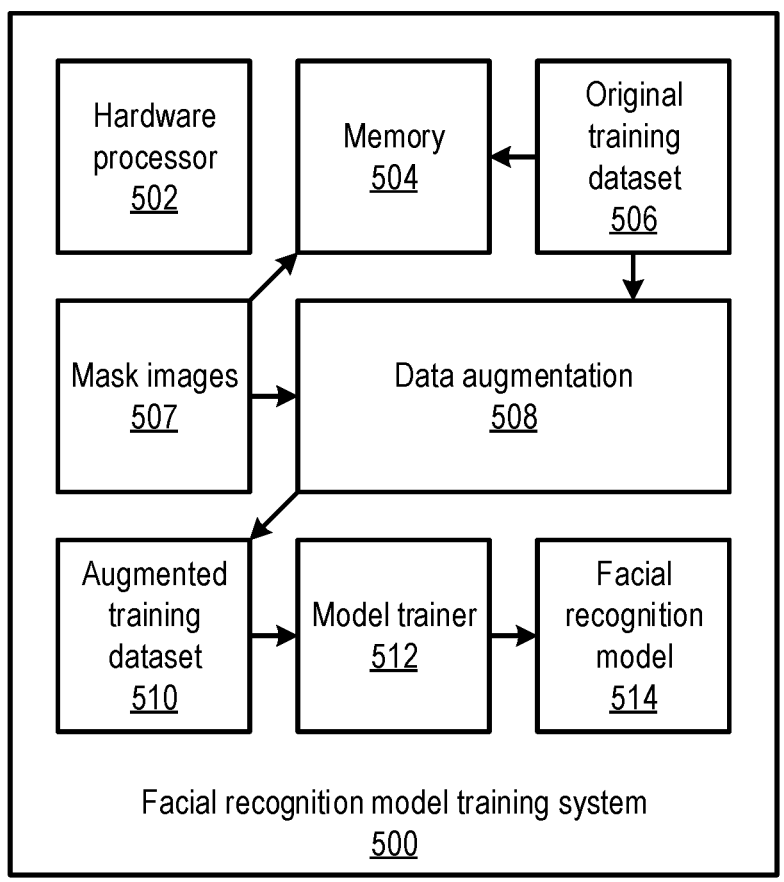
FIG. 5 is a block diagram of a facial recognition model training system that performs data augmentation to add masks to an original training dataset, in accordance with an embodiment of the present invention.

Referring now to FIG. 5, a facial recognition model training system 500 is shown. The system 500 includes a hardware processor 502 and a memory 504. The memory 504 may hold an original training dataset 506 and a set of mask images 507. The system 500 may further include a number of functional modules. Each functional module may be implemented as software that is stored in the memory 504 and that is executed by the hardware processor. In some cases, one or more functional module may be implemented in the form of discrete hardware components, for example as application-specific integrated chips or FPGAs.

Data augmentation 508 augments the original training dataset 506 using the mask images 507 to generate training images that include mask occlusion. As noted above, any appropriate process may be used to introduce these masks, such as a two-dimensional affine transformation or a style transfer using a GAN. The result is an augmented training dataset 510.

A model trainer 512 operates to train the facial recognition model 514. The model may be implemented as an ANN, such as a deep residual neural network with a large number of convolutional layers, to recognize facial features based on an input image. By incorporating images of masked individuals in the augmented training dataset, the model trainer 512 creates trains the facial recognition model 514 to also be sensitive to faces that are wearing masks.

An ANN is an information processing system that is inspired by biological nervous systems, such as the brain. The key element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Figure 6:
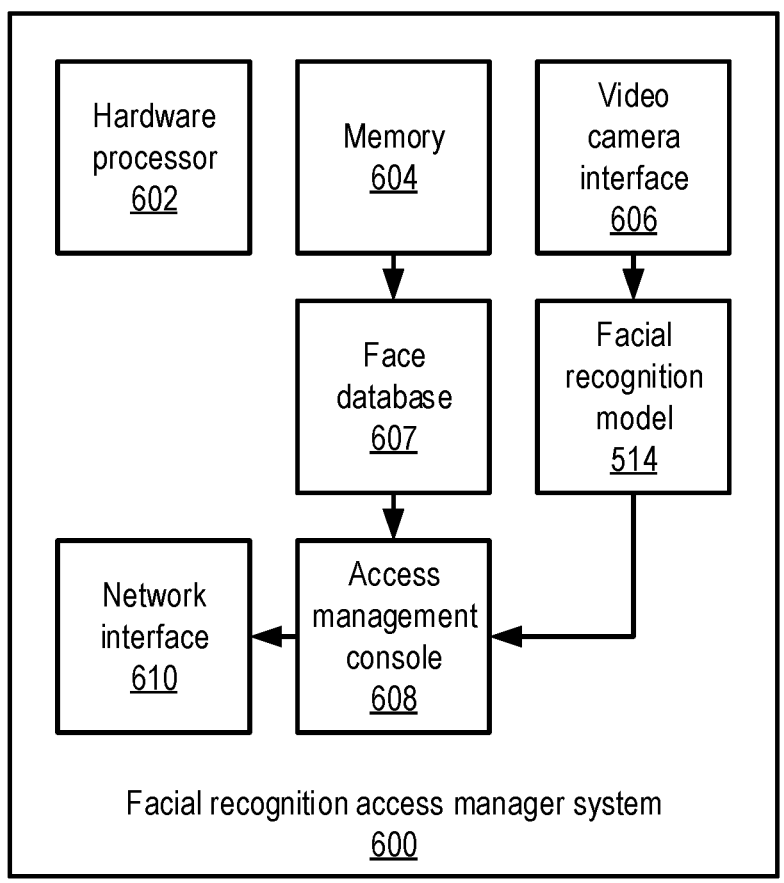
FIG. 6 is a block diagram of a facial recognition access manager system that uses a trained facial recognition model to recognize individuals who are wearing masks, in accordance with an embodiment of the present invention.

Referring now to FIG. 6, a facial recognition access manager system 600 is shown. The facial recognition manager system 600 may include a hardware processor 602 and a memory 604. The system 600 may further include a number of functional modules. Each functional module may be implemented as software that is stored in the memory 504 and that is executed by the hardware processor. In some cases, one or more functional module may be implemented in the form of discrete hardware components, for example as application-specific integrated chips or FPGAs.

A video camera interface 606 receives information from the video camera(s) 114 by any appropriate wired or wireless communications medium and protocol. The video camera interface 114 may be a dedicated interface that receives information directly from the video cameras 114, or may use a network interface 610 to receive the information via a computer network.

The information from the video cameras 114 is processed by the facial recognition model 514. The facial recognition model 514 may be trained locally, for example by incorporating the facial recognition model training system 500 into the same device as the facial recognition access manager system, or may be trained remotely before being transferred to the facial recognition access manager system. The facial recognition model outputs information that may be used to refer to the face database 607, which may be stored in memory 604.

An access management console 608 uses the face database 607 to determine whether the face recognized by the facial recognition model belongs to an authorized user. This may include a determination of access privileges. The access management console 608 may provide information to a human operator, for example indicating a level of access privilege for a person attempting to enter a controlled area 104, or providing an alert when an unauthorized person attempts to enter. The access management console 608 may further take an automatic action, such as by unlocking a door or turnstile, by transmitting commands via the network interface 610.

Figure 7:
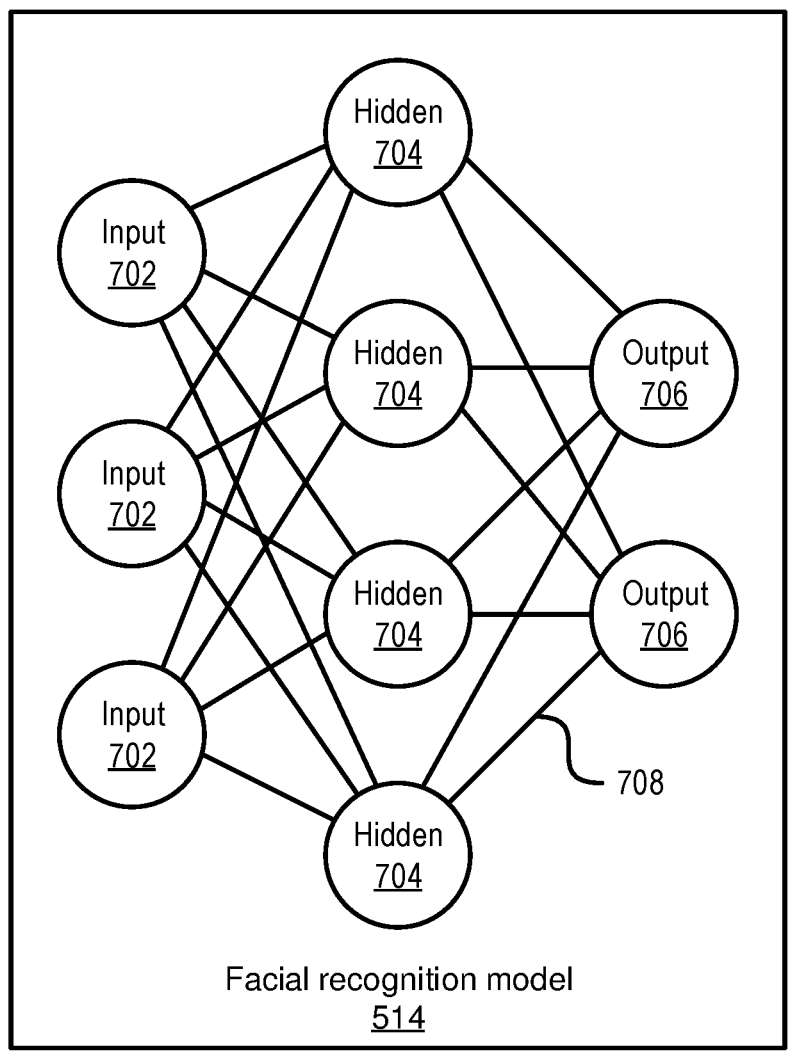
FIG. 7 is a block diagram of a facial recognition model, in accordance with an embodiment of the present invention.

Referring now to FIG. 7, a generalized diagram of a neural network is shown. Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 702 that provide information to one or more "hidden" neurons 704. Connections 708 between the input neurons 702 and hidden neurons 704 are weighted, and these weighted inputs are then processed by the hidden neurons 704 according to some function in the hidden neurons 704. There can be any number of layers of hidden neurons 704, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 706 accepts and processes weighted input from the last set of hidden neurons 704.

This represents a "feed-forward" computation, where information propagates from input neurons 702 to the output neurons 706. Upon completion of a feed-forward computation, the output is compared to a desired output available from training data. The error relative to the training data is then processed in "backpropagation" computation, where the hidden neurons 704 and input neurons 702 receive information regarding the error propagating backward from the output neurons 706. Once the backward error propagation has been completed, weight updates are performed, with the weighted connections 708 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be tested against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 708 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs.

Although a relatively simple architecture is described above, it should be understood that any appropriate ANN architecture may be used instead, with various layers being connected in ways that are appropriate to the application. For example, a deep residual neural network may be used, where skip connections may be used to preserve outputs of a given layer across multiple processing steps. In some embodiments, the network may be split into different branches after the last convolutional layer, each of which may include one fully connected layer. The first branch may output a vector, split into a set of sub-embeddings. The second branch may output a vector of confidence values for the sub-embeddings.

Figure 8:
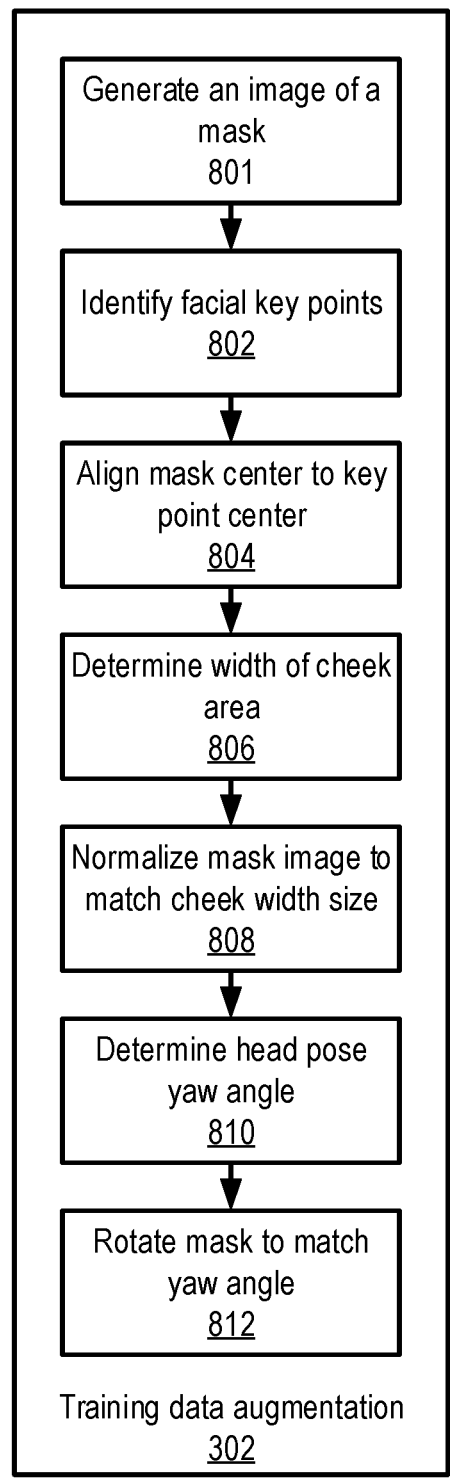
FIG. 8 is a block/flow diagram of a method of augmenting an original training dataset to include masks using an affine transformation, in accordance with an embodiment of the present invention.

Referring now to FIG. 8, a method for performing the augmentation of block 302 is shown. In some embodiments, augmentation may be performed with an affine transformation of a mask image to be positioned and sized appropriately as an overlay to a face image. Block 801 generates an image of a mask that may be applied to the training data. Block 802 identifies facial key points for a particular face image. For example, these key points may include eye corner points, mouth corner and edge points, cheek contour points, etc. Based on this geometric information, block 804 aligns the center of the mask image to the center of the detected facial key points.

Block 806 then determines the width of the cheek area, for example by finding a maximal distance between identified cheek contour points. Block 808 normalizes the mask image to match the width of the cheek area, thereby scaling the mask to match the size of the face. Block 810 determines the head pose yaw angle based on the axis of the connection of the center of the mouth and the center of the eyes in the fact image. Using this yaw angle, block 812 rotates the mask image to be the same yaw angle as the head, thereby aligning the mask with the head. In this manner, a mask image can be added to any input image that has a face in it, and the mask will be correctly positioned to provide realistic training data.

Figure 9:
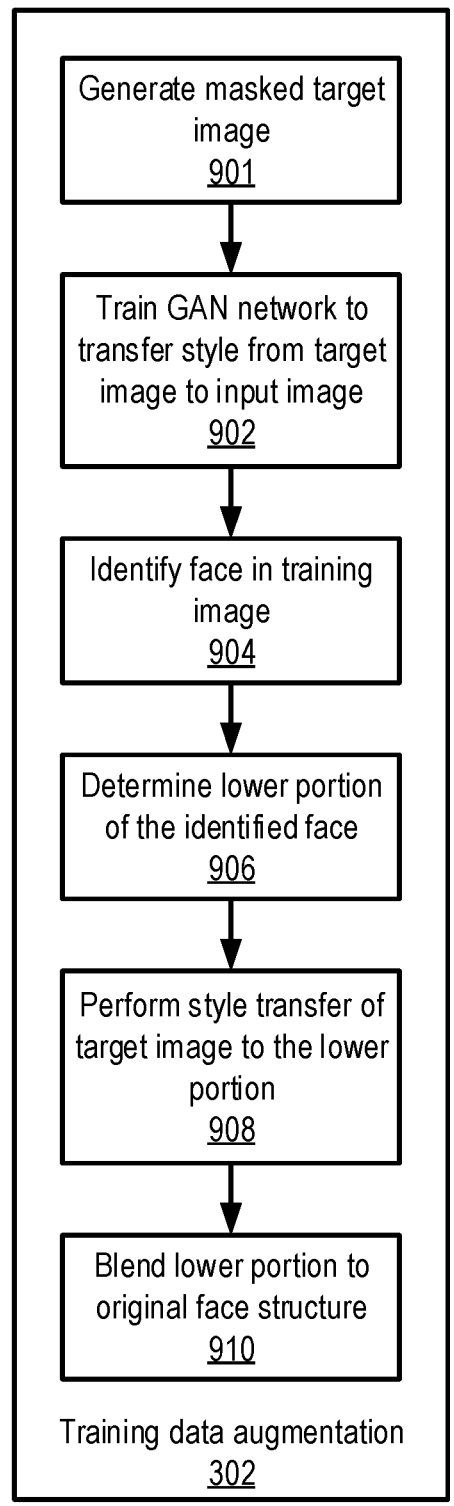
FIG. 9 is a block/flow diagram of a method of augmenting an original dataset to include masks using a generative adversarial network, in accordance with an embodiment of the present invention.

Referring now to FIG. 9, a method for performing the augmentation of block 302 is shown. In some embodiments, augmentation may be performed with a GAN that is trained to perform a style transfer. Block 901 generates a target image that includes, e.g., a mask. The target image may be a mask image, or may be an image of a masked face. Block 902 trains the GAN to transfer a style from the target image to an input image (e.g., an image from an original training dataset).

Block 904 identifies a face in an original training image. This may be performed using any appropriate form of face detection. Block 906 then identifies a lower portion of the identified face, for example using facial key point detection. The "lower portion" may be a portion of the face that would be covered if the individual were wearing a mask. Block 908 then uses the trained GAN to transfer the "mask" style from the target image to the original training image, thereby modifying the lower portion of the identified face to include a mask. Notably, in this process, the upper portion of the face (e.g., the portion that is not included in the lower portion) remains unchanged. This preserves identifiable visible features outside of the masked area.

Block 910 obtains a three-dimensional structure of the identified face and uses it to confirm that the modified lower portion continues to reflect the geometry of the original face image. Block 910 may modify the style-transferred image to bring it back into conformity with the three-dimensional structure of the identified face.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for training a neural network model, comprising:
    generating an image of a mask;
    generating a copy of an image from an original set of training data;
    altering the copy to add the image of a mask to a face detected within the copy by generating a style transformation of the detected face using a generative adversarial network, including blending the altered copy to conform to an original three-dimensional structure of the detected face;
    generating an augmented set of training data that includes the original set of training data and the altered copy; and
    training a neural network model to recognize masked faces using the augmented set of training data.

2. The method of claim I, wherein altering the copy includes performing an affine transformation on a mask image to align the mask image to the detected face.

3. The method of claim 2, wherein performing the affine transformation includes identifying facial key points of the detected face.

4. The method of claim 3, wherein performing the affine transformation includes scaling the mask image based on a width of the detected face, using the facial key points.

5. The method of claim 3, wherein performing the affine transformation includes aligning a center of the mask image to a center of the detected face, using the facial key points.

6. The method of claim 3, wherein performing the affine transformation includes rotating the mask image to match a head pose yaw angle of the detected face, based on the facial key points.

7. The method of claim 1, wherein generating the style transformation includes identifying a lower portion of the detected face.

8. The method of claim 7, wherein generating the style transformation includes modifying the lower portion of the detected face to include a mask, without altering a portion of the detected face outside the lower portion.

9. A system for training a neural network model, comprising:
a hardware processor; and
a memory that stores a computer program product, which, when executed by the hardware processor, causes the hardware processor to:
generate an image of a mask;
generate a copy of an image from an original set of training data;
alter the copy to add the image of a mask to a face detected within the copy using a style transformation of the detected face by a generative adversarial network that blends the altered copy to conform to an original three-dimensional structure of the detected face;
generate an augmented set of training data that includes the original set of training data and the altered copy; and
train a neural network model to recognize masked faces using the augmented set of training data.

10. The system of claim 9, wherein altering the copy includes performing an affine transformation on a mask image to align the mask image to the detected face.

11. The system of claim 10, wherein performing the affine transformation includes identifying facial key points of the detected face.

12. The system of claim 11, wherein performing the affine transformation includes scaling the mask image based on a width of the detected face, using the facial key points.

13. The system of claim 11, wherein, performing the affine transformation includes aligning a center of the mask image to a center of the detected face, using the facial key points.

14. The system of claim 11, wherein performing the affine transformation includes rotating the mask image to match a head pose yaw angle of the detected face, based on the facial key points.

15. The system of claim 9, wherein generating the style transformation includes identifying a lower portion of the detected face.

16. The system of claim 15, wherein generating the style transformation includes modifying the lower portion of the detected face to include a mask, without altering a portion of the detected face outside the lower portion.

* * * * *